United States Patent [19]

Baker et al.

[11] Patent Number: 5,198,975
[45] Date of Patent: Mar. 30, 1993

[54] APPARATUS AND METHOD FOR PROCESSING OF CHECK BATCHES IN BANKING OPERATIONS

[75] Inventors: Donna J. Baker; Kerry S. Jones, both of Phoenix, Ariz.

[73] Assignee: Valley National Bank, Phoenix, Ariz.

[21] Appl. No.: 444,009

[22] Filed: Nov. 30, 1989

[51] Int. Cl.⁵ ............................................. G06F 15/00
[52] U.S. Cl. ..................................... 364/406; 235/379; 283/58
[58] Field of Search ................. 364/406; 235/379, 493, 235/494, 375; 283/57, 58

[56] References Cited

U.S. PATENT DOCUMENTS

| | | | |
|---|---|---|---|
| 3,995,750 | 12/1976 | Carlson | 400/62 |
| 4,027,142 | 5/1977 | Paup et al. | 235/379 |
| 4,264,808 | 4/1981 | Owens et al. | 235/379 |
| 4,358,671 | 11/1982 | Case | 235/494 |
| 4,387,639 | 6/1983 | Brown et al. | 364/478 |
| 4,417,136 | 11/1983 | Rushby et al. | 235/379 |
| 4,523,330 | 6/1985 | Caun | 235/379 |
| 4,584,703 | 4/1986 | Hallberg | 382/50 |
| 4,724,309 | 2/1988 | Grune | 235/468 |
| 4,748,673 | 5/1988 | Bau et al. | 382/7 |
| 4,758,713 | 7/1988 | Matsukawa | 235/379 |
| 4,776,021 | 10/1988 | Ho | 382/7 |
| 4,797,938 | 1/1989 | Will | 382/7 |
| 4,803,347 | 2/1989 | Sugahara et al. | 235/379 |
| 4,813,077 | 3/1989 | Woods et al. | 382/7 |

Primary Examiner—Roy N. Envall, Jr.
Assistant Examiner—Laura Brutman
Attorney, Agent, or Firm—Charles E. Cates; William W. Holloway

[57] ABSTRACT

In the transfer of checks between facilities receiving checks and facilities for processing checks, checks are sorted into batches according to selected classifications at the check receiving facilities. The checks are accumulated in bundles and transferred to the check processing facility according to a predetermined schedule. In the present invention, a batch slip is provided with each transferred bundle. The batch slip identifies the type of checks in the batch, identification of the receiving facility and a sequence number. The information is provided both in a bar code format and in a MICR format. The batch slip is kept with the associated batch of checks during the processing in the processing facility. Bar code readers are provided at various processing stations. The information extracted by the bar code readers and the MICR readers are transferred to a central processing unit where the data can be analyzed and detailed information concerning current and previous processing activity and data files displayed or provided in reports.

20 Claims, 4 Drawing Sheets

APPARATUS AND METHOD FOR PROCESSING OF CHECK BATCHES IN BANKING OPERATIONS

BACKGROUND OF THE INVENTION

1. Field of the Invention

This invention relates to the manipulation of transaction records in a financial institution and, more particularly, to the processing of checks within a multibranch banking organization.

2. Description of the Related Art

The expeditious processing of checks and other transaction records is necessary to minimize the "float" or the funds, represented by transaction records, which are not yet assigned to the target account. Even when the time involved in the transfer is relatively short, the amount of funds in the process of being transferred at any one time can be substantial, resulting in loss of interest.

Referring to FIG. 1, the method of processing checks, according to the prior art, is shown. In step 101, checks are received by a representative of the financial institution, typically at a branch banking or customer facility, and entered into the system for processing checks. At the time the checks are received into a system, the checks are divided into batches, each batch having having a single category of checks included therein in step 102. Typical categories can include large dollar amounts, cashed checks, regular work, and authorized post batch slips. As will be clear, other category groups can be utilized. In step 103, the batches of checks are accumulated in bundles and moved to the central processing location according to a predetermined schedule (i.e. to avoid extraordinary processing requirements at the end of the working day). The bundles that are transferred have an identification slip associated therewith that identifies the originating collecting facility. The bundle which is transferred between the collecting facility and the processing facility is weighed in step 104. The weight of the bundle provides a measure of the number of checks and other transaction records to be processed by the processing facility. The weight of the bundles can be used to determine the schedule for processing the incoming bundles. In step 105, the operators take the checks and transaction records and add the dollar amount in Magnetic Ink Character Recognition (MICR) format fields on the checks and transaction records themselves. The checks and transaction records have information preprinted thereon in MICR fields related to the financial institution issuing the check or transaction record, the customer account of the issuing financial institution, and a sequence number. In step 106, the checks and other transaction records are entered in a MICR reader/sorter machine responsive to the magnetic ink information both preprinted on the checks and transaction records and the magnetic ink information (dollar amount) applied thereto by the operator. The MICR reader/sorters are high speed apparatus which extracts the information in the MICR fields and transmits the information in digitized form to a central processing unit. The MICR reader/sorters, based on the information in the MICR fields, distributes the checks and transaction records to appropriate bins. In step 107, the checks and transaction records in the bins are disposed of in preselected manner. For example, the processed work items can be returned to the appropriate customers. In step 108, reports of the work item processing, including weight of incoming bundles or information resulting from operation of the the MICR reader/sorters, can be provided.

The procedure described above provides limited information with respect to transaction processing activity. The information with respect to the weight of the bundles transferred to the processing facility is used only to schedule the transfer of bundles from the remote location. In particular, the weight information is used to prevent the bulk of the checks and transaction records from being forwarded to a processing facility at the end of the day. In addition, the weight is not easily integrated with the information provided by the MICR fields and can only approximate the actual number of checks included in the bundle. This procedure does not provide detailed information concerning the processing of the transaction batches nor is information available to permit "float" management.

Several improvements on the prior art method of processing checks have been identified. More specifically, improvements have been identified in the MICR apparatus and in techniques for automating the entry of the dollar amount into the data processing system, i.e., without entering the dollar amounts of the checks. In U.S. Pat. No. 5,523,330, issued Jun. 11, 1985 in the name of, J. D. Cain, a MICR reader and a character recognition system are used to eliminate the step for adding dollar amounts by an operator. U.S. Pat. No. 4,584,703, issued Apr. 22, 1986 in the name of, L. O. Hallberg, describes a character recognition system such as could be used to read dollar amounts on checks. U.S. Pat. No. 4,724,309, issued Feb. 9, 1988 in the name of E. B. Greene provides a reader capable of processing checks that includes a special technique for identifying selected fields. U.S. Pat. No. 4,748,673, issued May 31, 1988 in the name of Y. Barre et al, describes an improved magneto-optical character reader wherein the reading heads are not fixed. U.S. Pat. No. 4,776,021, issued Oct. 4, 1988 in the name of B. C. M. Ho discloses an improved MICR reader which provides compensation for the speed of slips being processed. U.S. Pat. No. 4,797,938, issued Jan. 10, 1989 in the name of, T. A. Will provides an improved MICR reader wherein the signals from the reader are compared with templates to increase the accuracy. U.S. Pat. No. 4,813,077, issued Mar. 14, 1989 in the name of D. E. Woods, discloses apparatus that permits business transactions (checks) to be processed automatically when selected characters, i.e., dollar amounts can be identified. Otherwise, the transactions must be manually processed. In U.S. Pat. No. 4,803,347, issued Feb. 7, 1989 in the name of Y. Sugahara et al, apparatus is disclosed for improving the operation of remote banking apparatus by providing for off-line execution of certain operations.

A need has been felt for a technique that can be used to monitor the progress of a check and transaction record processing activity without the delay resulting for manual input of data and without elaborate character recognition apparatus. The technique should provide for the integration of ancillary information with the information from the MICR fields in a manner that will assist in the monitoring and control of the processing activity.

FEATURES OF THE INVENTION

It is an object of the present invention to provide improved procedures for banking operations.

It is a feature of the present invention to provide improved procedures for the processing of checks and transaction records.

It is another feature of the present invention to provide batch slips with each batch of checks and transaction records that are to be processed.

It is yet another feature of the present invention to provide a batch slip with each batch of checks or transaction records to be processed that is encoded in optical character recognition format and in MICR format characters.

It is a more particular feature of the present invention to provide a data processing system with bar code readers and with MICR reader/sorters for extracting information with respect to check and transaction record processing, the data processing system combining the information provided by batches of checks and transaction records and provided by the batch slip associated with each batch.

SUMMARY OF THE INVENTION

The aforementioned and other features are accomplished, according to the present invention, by providing a system for processing checks and other transaction records with MICR reader/sorters and bar code readers along with appropriate interface apparatus to transmit the information extracted from MICR and bar code format fields to a central processing unit. Associated with each batch of checks or transaction records is a batch slip. The batch slip includes identification of the originating facility, the type of check or transaction record, and sequence number. The bar code readers can be placed at check points in the processing operations to determine the transfer of a batch of checks or transaction records to a different operation. For example, a bar code reader (or readers) can be positioned so that the initiation and the completion of the operation placing the additional (dollar amount) information on the checks and transaction records can be communicated to the central processing unit. The central processing unit can automatically associate a time for the receipt of additional information from each batch. By placing the information on the batch slip in the MICR format, the information can be extracted by a MICR reader/sorter, eliminating a requirement for an additional bar code reader at this stage of the processing operation. The use of the bar code readers provides for efficient automatic data entry with relatively inexpensive data processing apparatus.

These and other features of the invention will be understood upon reading of the following description along with the drawings.

DESCRIPTION OF THE PREFERRED EMBODIMENT

1. Detailed Description of the Figures

Figure 1:
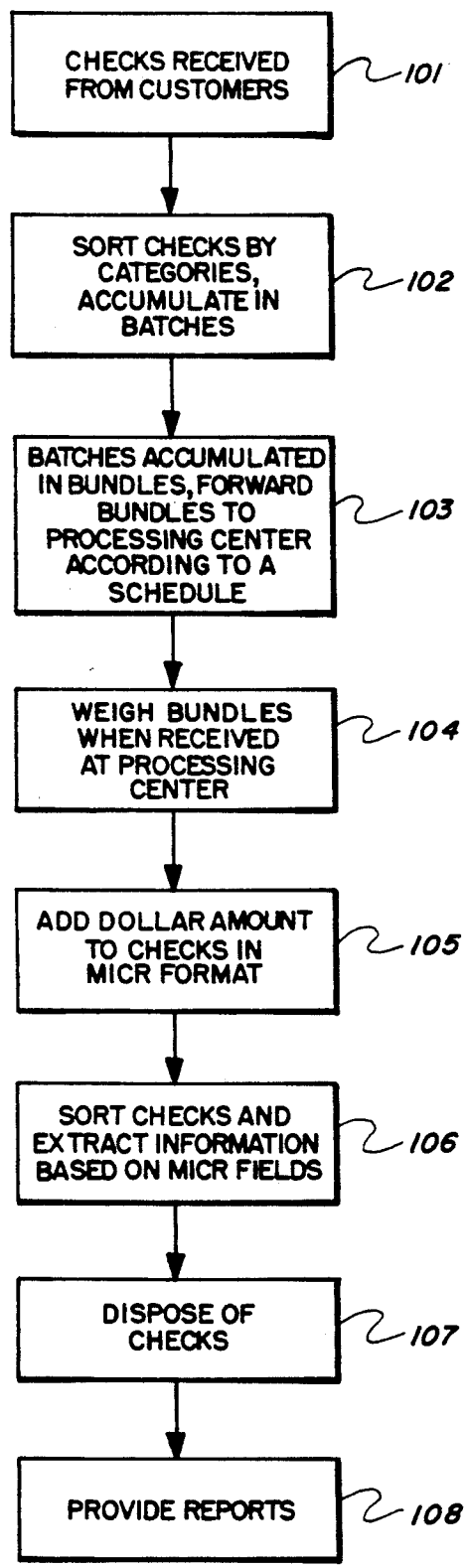
FIG. 1 is a flow diagram illustrating the procedure for processing checks according to the prior art.
Figure 2:
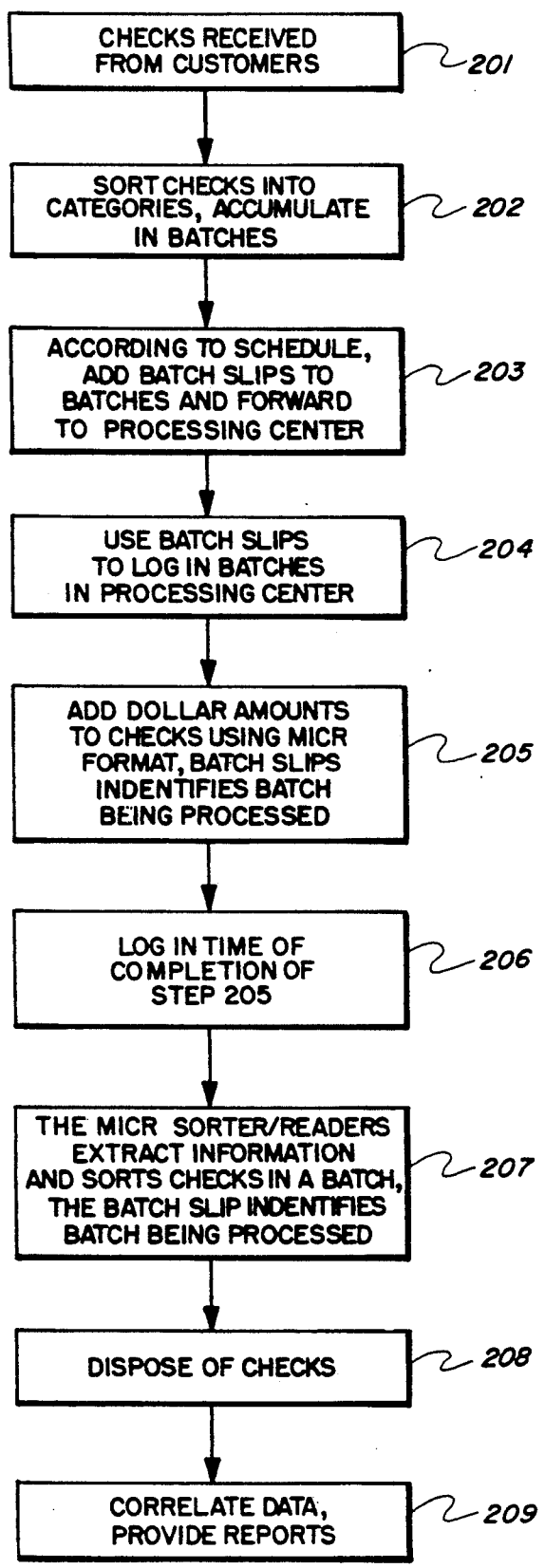
FIG. 2 is a flow diagram illustrating the procedure for processing checks according to the present invention.

Referring now to FIG. 2, the flow diagram for processing checks according to the present invention is illustrated. Steps 201 and 202, wherein the organization receives checks from customers and the checks are sorted into preselected categories, are the same as in the prior art described in FIG. 1. In step 203, the batches of checks are transferred to the processing operation as in the equivalent step of the prior art process. However, in this step in the present invention, a batch slip is associated with each batch. The batch slip has information preprinted thereon which identifies the facility from which the batch originated, an identification of the type of check or transaction record included in the associated batch, a unique sequence number. Thus, when the batch is logged in, as in step 204, a bar code reader can be used to enter conveniently the preprinted information into the central processing unit. In step 205, the dollar amount is added to the checks in the MICR format. This addition is a hand operation and, therefore, can impact the productivity of the check and transaction record processing operation. Therefore, the initiation of the activity can be signaled to the central processing unit by passing the batch slip past the bar code reader and the end of the activity can be similarly signaled by means of the bar code reader. In step 206, the time of completion of the activity performed in step 205 is entered in the data processing system. In step 207, the checks and transaction records are processed by the MICR sorter/reader based on the MICR field. The batch slip, having the information in MICR format, can automatically associate the activity and, where of interest, each check and transaction record with the related batch. Because of the speed of the MICR apparatus, the time for processing each batch is relatively small. In step 208, the disposition of the checks, typically determined by the result of the MICR sort operation, completes the processing operation for the checks and transaction records. In step 209, the central processing unit can provide reports identifying parameters of the processing operation. Furthermore, the historical records, stored in the data processing system can be used to provide data base for analyzing the current processing activity.

Figure 3:
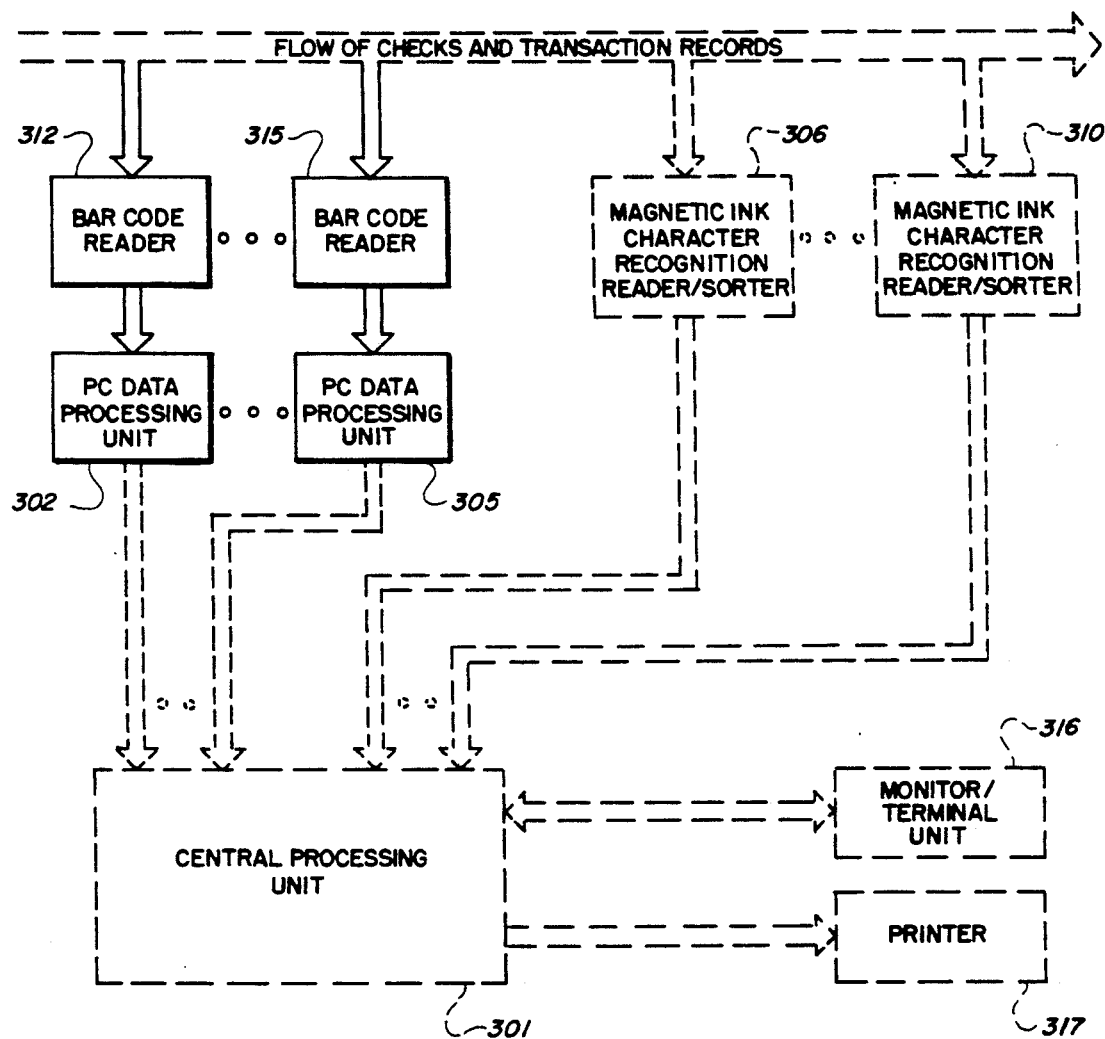
FIG. 3 illustrates the additional apparatus required to implement the present invention.

Referring to FIG. 3, the additional apparatus required to implement the present invention is shown. In the prior art technique for processing checks, the central processing unit 301 exchanges signals with a plurality of magnetic ink character recognition (MICR) reader/sorters 306-310, the flow of the checks and transaction records 300 being through the MICR reader/sorters. The central processing unit 301 also can exchange signals with the monitor/terminal unit 312, the monitor/terminal unit 312 permitting control of the central processing unit and permitting display of system parameters. A printer is typically provided to generate report and parameter information hardcopies. In order to implement the present invention, bar code readers (312-315), interacting with the processing of checks and transaction records are each associated with a PC data processing unit (or other type relatively unsophisticated data processing unit) (302-305). The PC data processing unit serves as an interface for the data by the bar code reader from the batch slips, process the data internally, and provide the interface protocols for transmitting the data to the central processing unit 301. In addition, the PC data processing units can be used to reconfigure the station extracting the data from the batch slips by redefining for the data processing system the interpretation of the extracted data identified.

Figure 4:
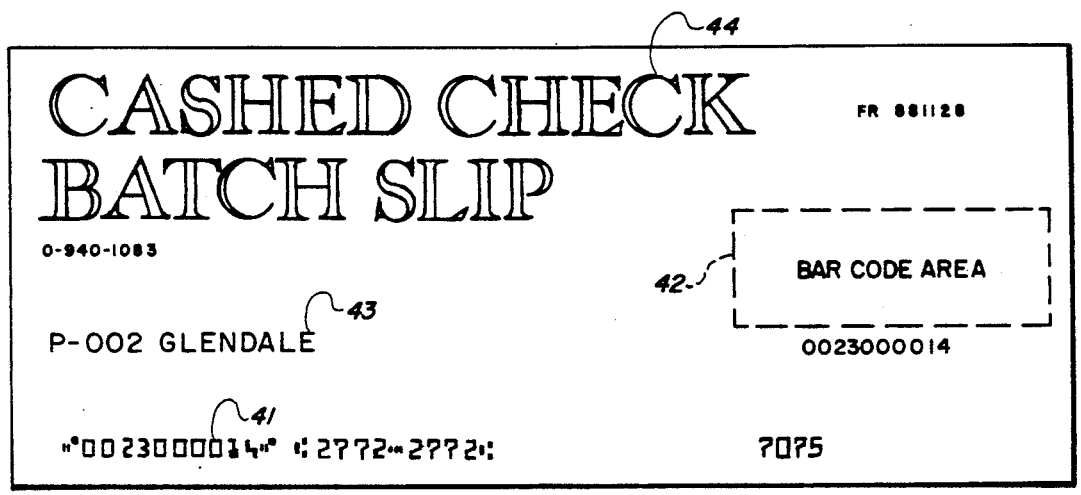
FIG. 4 is a sample of a batch slip according to one embodiment of the present invention.

Referring to FIG. 4, a batch slip according to the present invention is illustrated. The location information and the type of check is included in the MICR format 41, the bar code format 42, and in operator readable format 43. The information includes a unique serial number.

2. Operation of the Preferred Embodiment

The present invention uses relatively little additional apparatus and support activity to gain important information with respect to the check processing operation. The use of the batch slips with bar code format and MICR format fields to provide information has several advantages. The bar code readers operate at a speed much greater than is possible with manual data entry. The bar code readers can be conveniently positioned so that the batch slip can be exposed to the bar code reader without appreciable diversion from the flow of the processing operations. The bar code readers are further able to be coupled to relatively inexpensive data processing apparatus such as PC computers. The PC computers, to which the bar code readers are coupled, can provide stand-alone processing capability or can interface with central processing unit. The progress of a particular batch (identified by the batch sequence number) through the processing operation can be monitored. In this manner, inadvertently misplaced batches of checks and transaction records can be identified and the last completed processing operation can be identified. Moreover, the time for particular operations, such as the entry of dollar amounts in MICR format, can be determined. Using this time interval, along with the number of checks and transaction records in the associated batch as determined by MICR reader/sorter, can provide the productivity of an operator. The inclusion of the MICR fields on the batch slip permits the use of the MICR reader/sorters to extract information from the batch slip thereby associating the parameters of the information extracted from the MICR fields of the checks and transaction records with the batch sequence number in the central processing unit. By way of example, the need to weigh batches or bundles is eliminated because the exact number of work items associated with each batch number can be determined.

In U.S. Pat. No. 4,758,713, issued Jul. 19, 1988 in the name of Matsukawa, a magnetic strip associated with a passbook is used to confirm a client identity provided by data on a transaction slip. In this apparatus, the secondary information source is not used as a processing tool, but as a confirmation of a relationship between two documents.

While the present invention has been described in terms of information encoded in a bar code format along with the MICR format, it will be clear that other types of readers such as an optical character readers can be used. However, the bar code format has the advantages of greater reliability and less expense. The information provided on the batch slips in various formats is also provided in operator readable format to respond to exceptional situations in the check and transaction record processing. Recently, the use of high-speed optical character reader/sorters to replace the MICR reader/sorters has been implemented. The invention will facilitate the acquisition of information concerning processing of checks and transaction records.

The invention has been described in terms of a plurality of bar code readers. It will be clear, however, a batch slip can be exposed to a single bar code reader at a plurality of points in the processing sequence when provision is made to identify the point of the processing operation sequence at which data is being entered into the system. Recently, attempts have been made to apply the dollar amount and other information to a check or transaction record by means of an optical character recognition device, the applied information being in a MICR format or in another image character recognition format. The present invention can work advantageously to facilitate information acquisition regarding the check and transaction record processing with these changes in the processing implementation.

The reports that can be provided concerning the check and transaction record processing using the present invention is greatly increased. As pointed out above, batches that are mislaid during the processing operation sequence can be identified, productivity for selected operations can be provided, and time to perform selected processes can be determined. Because the check and transaction record dollar amounts are included in the acquired information, and because the data processing system can maintain historical records of acquired information, the reports can be used to manage the "float", e.g., by insuring that checks regularly deposited for large amounts and drawn on out of state banks are promptly transported to the processing facility. The reports can be used to increase efficiency and to determine where additional resources can be provided to increase the productivity of the operation.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method of processing checks, said checks including associated deposit slips, said method comprising the steps of:

grouping the checks received at remote locations in batches according to one of a plurality of check characteristics;

coupling a preprinted batch slip with each batch, said batch slip including information encoded in MICR format and in bar code format, said encoded information including an identification of said remote location and a check characteristic;

periodically transmitting said batches to a processing station;

processing said checks in said batches;

entering information into a data processing system by apparatus responsive to said information encoded in said bar code format, said entering information being performed at a preselected juncture in said processing checks;

entering sad information encoded in said MICR format in said data processing system by means of a MICR reader/sorter, said MICR reader/sorter extracting information from said checks; and storing, in said data processing system, identifying information from said batch slip together with information related to said checks coupled to said batch slip.

2. The method of claim 1 wherein said coupling step includes a step of preprinting a serial number in said MICR and bar codes formats as part of said encoded information; and said entering information into a data processing system by apparatus responsive to said information encoded in said bar code format step includes a step of entering information encoded in said bar code format at a plurality of preselected junctures in said processing checks.

3. The method of claim 2 wherein sad processing step includes a step of applying dollar amount information on said check in MICR format fields.

4. The method of claim 3 further comprising the step of determining how many checks and the dollar amounts of said checks are transmitted from each location.

5. The method of claim 3 further comprising the step of determining productivity for an operator performing said applying step.

6. The method of claim 2 wherein said coupling step further includes the step of printing a type of check code on said batch slip.

7. The method of claim 1 wherein said grouping step includes a step of providing separate batches for each of a plurality of checks.

8. A system for processing work items, said work items having information printed in a MICR format thereon, said work items being accumulated in batches at remote sites according to work item information categories, said work items being transferred to a processing facility, said system comprising:
- a batch slip associated with each batch, said batch slip having information preprinted thereon in a first readable format and in a MICR format, said information including at least a sequence number identifying said remote site at which said batch work items are accumulated and a work item category for the associated work item batch;
- a central processing unit;
- at least one reader responsive to said first readable format for extracting and transferring information from said batch slip to said central processing system, said batch slip being read by said at least one reader at a plurality of preselected junctures in said processing work items, an identification of a reading juncture being stored with a batch slip identification each time said batch slip is read; and
- at least one MICR reader responsive to MICR fields for extracting and transferring information from said work items and said batch slip to said central processing unit, wherein identifying information extracted from said batch slip is stored together with information from work items associated with said batch slip.

9. The system of claim 8 further comprising apparatus for applying a dollar amount to a work item in a MICR format prior to extracting of information of said batch including said work item prior to extracting of information by said MICR reader.

10. The system of claim 9 wherein said applying a dollar amount is performed automatically by a character recognition system.

11. The system of claim 8 wherein sad first readable format is a bar code format and said first reader is a bar code reader.

12. The system of claim 8 wherein said information preprinted on said batch slip includes an orientating location and a type of work item in said batch.

13. The system of claim 8 wherein said work items include checks.

14. The system of claim 8 wherein said MICR reader includes apparatus for sorting said work items into predetermined categories.

15. The method of processing work items from remote sites, said work items having information in a high-speed image character recognition format printed thereon; said method comprising the steps of:
- dividing sad work items into batches at said remote site, each batch having work items having one of a plurality of selected informational characteristics;
- coupling a batch slip to each batch, said each batch slip including at least a sequence number printed thereon, said sequence number printed in a first machine readable format and in said image character recognition format, said sequence number identifying a remote location and a selected informational characteristic;
- reading said sequence number having said first machine readable format from a batch slip at a predetermined juncture in said processing work items associated with said batch slip;
- reading said printed information having said image character recognition format on work items of said batch coupled to said batch slip from which said sequence number was read; and
- transferring information from said reading steps to a central processing unit, wherein identifying parameters of said processing work items and parameters of said work items are stored in a together with said batch slip sequence number.

16. The method of claim 15 comprising a step of entering a time when a transfer of said sequence number read from said batch slip is performed.

17. The method of claim 15 further comprising the step of preprinting said information in said first machine readable format in a bar code format.

18. The method of claim 15 wherein the step of reading said sequence number is performed at a plurality of predetermined junctures in processing said work items.

19. The method of claim 15 further comprising the step of applying dollar amounts to said work items in said image character recognition format prior to reading image character recognition information therefrom.

20. The method of claim 15 further comprising a step of analyzing information transferred to said central processing unit to determine parameters associated with processing said work items.

* * * * *

UNITED STATES PATENT AND TRADEMARK OFFICE
CERTIFICATE OF CORRECTION

PATENT NO. : 5,198,975

DATED : March 30, 1993

INVENTOR(S) : Baker et al

It is certified that error appears in the above-identified patent and that said Letters Patent is hereby corrected as shown below:

In Claim 11, column 8, line 4, "sad" is changed to --said--.

In Claim 12, column 8, line 8, "orientating" is changed to --originating--.

In Claim 15, column 8, line 19, "sad" is changed to --said--.

Signed and Sealed this

Thirtieth Day of November, 1993

*Attest:*

BRUCE LEHMAN

*Attesting Officer*     *Commissioner of Patents and Trademarks*